United States Patent [19]

Miyahara et al.

[11] Patent Number: 5,170,859
[45] Date of Patent: Dec. 15, 1992

[54] CONSTANT-SPEED CRUISING SYSTEM FOR A VEHICLE

[75] Inventors: Katumi Miyahara; Yoshiaki Anan; Yoshiki Kubo; Hiroshi Ueda; Takeshi Yamane, all of Hiroshima, Japan

[73] Assignees: Mazda Motor Corporation; Naldec Corporation, Hiroshima, Japan

[21] Appl. No.: 516,184

[22] Filed: Apr. 30, 1990

[30] Foreign Application Priority Data

Apr. 30, 1989 [JP] Japan .................................. 1-110788

[51] Int. Cl.$^5$ ............................................. B60K 31/02
[52] U.S. Cl. .................................... 180/178; 180/170; 364/431.11
[58] Field of Search ................ 180/170, 177, 179, 175, 180/176, 178; 123/352, 396; 364/431.11

[56] References Cited

U.S. PATENT DOCUMENTS

| | | | |
|---|---|---|---|
| 4,451,888 | 5/1984 | Kuno et al. | 123/352 |
| 4,914,596 | 4/1990 | Etoh et al. | 180/179 |
| 4,939,657 | 7/1990 | Imai et al. | 180/179 |
| 5,025,379 | 6/1991 | Etoh et al. | 180/179 |
| 5,050,698 | 9/1991 | Maeda et al. | 180/178 |

FOREIGN PATENT DOCUMENTS 59-10361  4/1984  Japan .

Primary Examiner—Eric D. Culbreth
Attorney, Agent, or Firm—Fish & Richardson

[57] ABSTRACT

The constant-speed cruising control is performed on the basis of instruction signals from a set switch or the like so that the vehicle speed will reach a target vehicle speed. The constant-speed cruising control is executed so that all switches, such as the set switch or the like, which constitute the instruction signal generating unit, are turned off. This can inhibit the execution of the constant-speed cruising control if the set switch becomes fixed and stays in its ON state.

17 Claims, 7 Drawing Sheets

CONSTANT-SPEED CRUISING SYSTEM FOR A VEHICLE

BACKGROUND OF THE INVENTION

1. Field of the Invention

The present invention relates to a constant-speed cruising system for a vehicle, adapted to automatically control a vehicle speed governing mechanism of an engine so as to reach a target vehicle speed set by the driver.

2. Discussion of the Related Art.

For the engine of an Otto type, for example, it is common that a constant-speed cruising system for the vehicle is designed to subject a vehicle speed governing mechanism such as a throttle valve and so on to feedback control on the basis of output from a vehicle speed detecting means for detecting an actual vehicle speed.

Japanese Utility Model Examined Publication (Kokoku) No. 10,361/1984 discloses a constant-speed cruising system in which a microcomputer is used as a control unit for constant-speed cruising control. This constant-speed cruising system has a set switch and a cancel switch as instruction signal outputting means to be outputted to the control unit. The set switch has the function to set an actual vehicle speed to a target vehicle speed for constant-speed cruising control at the time when the driver has turned the set switch on. The cancel switch may include, for example, a brake switch and so on, which is disposed on a foot brake pedal, and it is designed such that the brake switch is turned on as the foot brake pedal is stepped down, thereby releasing the constant-speed cruising control.

It is further disclosed in the above-mentioned publication that a clutch interposed between the throttle valve and an actuator is turned on to connect the throttle valve to the actuator when the constant-speed cruising control is implemented and the clutch is turned off to disconnect the throttle valve from the actuator during no implementation of the the constant-speed cruising control. The clutch is provided with a clutch control circuit for its exclusive use in order to turn it on or off. The instruction signal for turning the clutch on or off is generated from the control unit to the clutch control circuit. The instruction signal for turning the clutch off is generated directly to the clutch control circuit from the cancel switch, and the clutch control circuit turns the clutch off immediately in response to the instruction signal from the cancel switch.

SUMMARY OF THE INVENTION

The present invention has the object to provide a constant-speed cruising system for a vehicle adapted to prevent a fail operation which may be caused when a switch, such as the set switch or the like, for generating a variety of instruction signals is maintained in the ON position.

In order to achieve the object, the present invention consists of a constant-speed cruising system for a vehicle, comprising:
  a vehicle speed governing means of an engine;
  a control unit for constant-speed cruising control, which controls the vehicle speed governing means so as for a vehicle speed to reach a target vehicle speed; and
  an instruction signal generating means for generating a variety of instruction signals for constant-speed cruising control to the control unit;
  wherein the instruction signal generating means has a plurality of switch means to be manually operated by a driver and the switch means generates the instruction signals when turned on; and
  wherein the control unit has a judgement means for judging whether or not to implement constant-speed cruising control on the basis of a signal from the switch means and the judgment means is designed to allow the constant-speed cruising control only when either one of the switch means is turned on after it is confirmed that all of the switch means are turned off.

This arrangement can inhibit the implementation of the constant-speed cruising control even if either one of the switch means would be fixed and stayed in its working position, thereby generating an instruction signal for constant-speed control. For instance, when the set switch is fixed in its ON position, the set switch keeps generating the instruction signal for implementing the constant-speed control to the control unit. However, the system according to the present invention inhibits the implementation of the constant-speed cruising control in this state, thereby avoiding the constant-speed control that is not intended to be implemented by the driver.

Other objects, features and advantages of the present invention will become apparent in the course of the description of the preferred embodiments which follows, in conjunction with the accompanying drawings.

DETAILED DESCRIPTION OF THE PREFERRED EMBODIMENTS

Outline Construction

Figure 1:
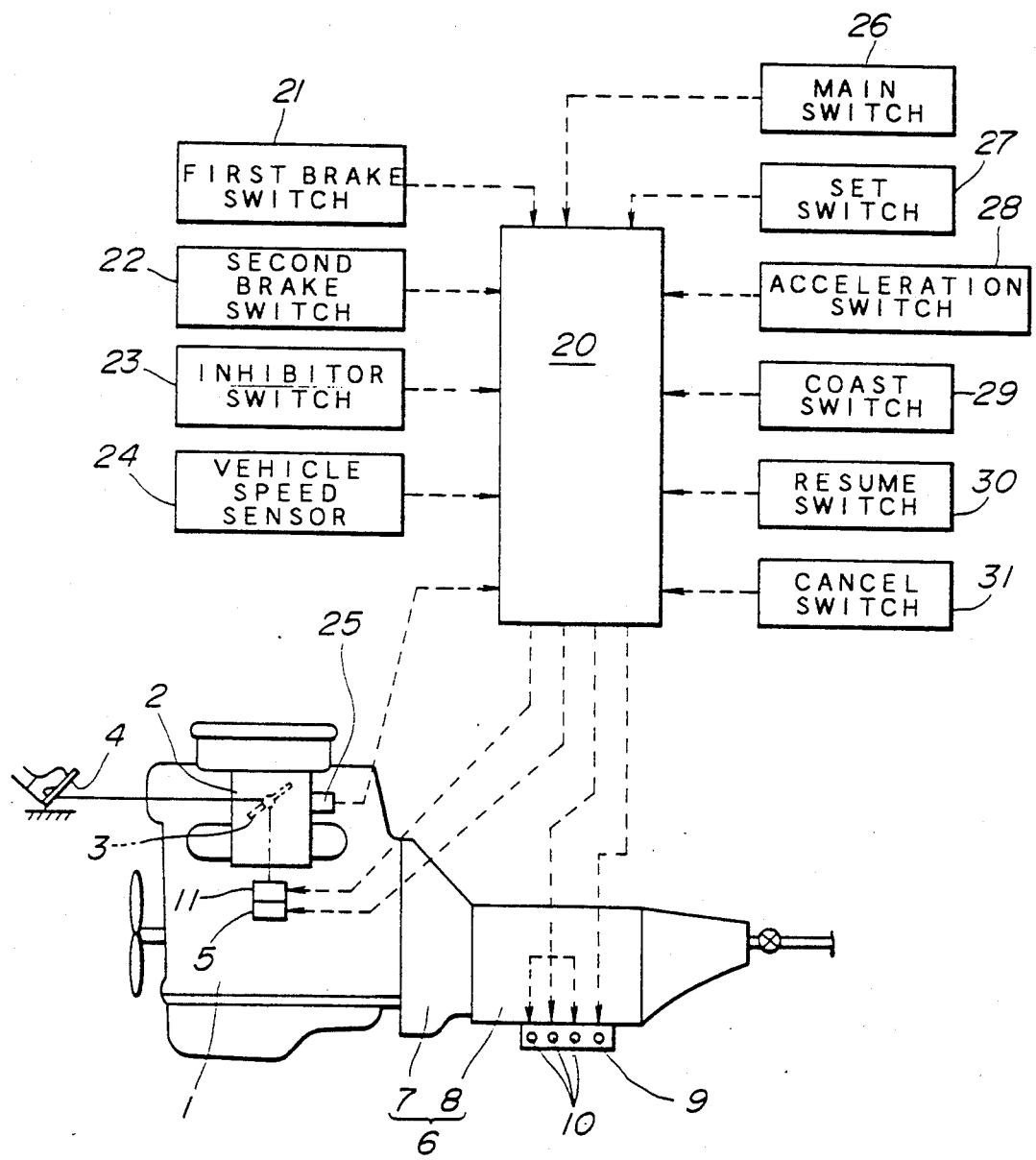
FIG. 1 is a diagrammatic representation showing an outline of an overall system according to the present invention.

As shown in FIG. 1, reference numeral 1 denotes an engine of the Otto type, which is provided at its air intake system 2 with a throttle valve 3 as a valve for controlling output. The throttle valve 3 is mechanically connected to an accelerator pedal 4 and designed so as to be manually opened or closed in accordance with the degree to which the accelerator pedal 4 is depressed as well as to be automatically opened or closed by a servo motor 5 as an actuator. The engine 1 is connected to an automatic transmission 6 and its output is transmitted through the automatic transmission 6 to wheels (not shown).

The automatic transmission 6 comprises a torque converter 7 and a multiple-stage gear set 8 of a planetary ger type. The torque converter 7 has a lock-up clutch (not shown) which is coupled or uncoupled by activating or inactivating a solenoid 9 for lock-up operation. The multiple-stage gear set 8 is designed so as to have four forward speed ranges, for example, and a desired speed stage can be performed by altering a combination of activation with inactivation of a plurality of solenoids 10 for shift operation, in the manner well known in the art. Needless to say, the solenoids 9 and 10 can shift modes of operation of a hydraulically-operable actuator for lock-up operation or for shift operation and further description thereof will be omitted herein because they are well known to those skilled in the art.

As shown in FIG. 1, reference numeral 20 denotes a control unit consisting of a microcomputer having RAM, ROM and so on, and signals are inputted into the control unit 20 from each of sensors and switches 21 to 31, inclusive.

The switches 21 and 22 are brake switches which are to be turned on by stepping a foot brake pedal (not shown) down or by braking. The reason for disposing two of the brake switches on the pedal is such that, even if one of them would not work, the other can start working. The switch 23 is an inhibitor switch that is turned on when the automatic transmission 6 is in the "D" position. The sensor 24 is to detect the vehicle speed. The sensor 25 is a potentiometer for detecting an opening angle of the throttle valve 2, or the throttle opening angle. The switches 26 to 31, inclusive, are for constant-speed cruising to be manually operated by the driver, in which the switch 26 is a main switch, the switch 27 is a set switch, the switch 28 is an acceleration switch, the switch 29 is a coast switch, the switch 30 is a resume switch, and the switch 31 is a cancel switch.

The control unit 20 generates shift control signals to each of the solenoids 9 and 10, a constant-speed control signal to the servo motor 5, and ON/OFF signals to a clutch 11 disposed at the servo motor 5. When the ON signal is generated, on the one hand, the clutch 11 is coupled to thereby connect the servo motor 5 to the throttle valve 3, while when the OFF signal is generated to the clutch 11 from the control unit 20, on the other, the clutch 11 is uncoupled to disconnect the servo motor 5 from the throttle valve 3.

Outline of Constant-Speed Cruising Control

The shift control (lock-up control) by the control unit 20 may be performed in conventional manner so that description thereof in detail will be omitted herein for avoidance of duplicate explanation. Here will be made description of the constant-speed cruising control.

When the constant-speed cruising control is not under way, on the one hand, the clutch 11 is in an uncoupled state and the throttle valve 3 is disconnected from the actuator 5 (servo motor). The throttle valve 3 is designed so as to be opened or closed exclusively by means of manual operation, namely, by stepping the accelerator pedal 4 or by releasing the pedal 4. When the constant-speed cruising control is under way, on the other hand, the clutch 11 is in a coupled state, thereby allowing the throttle valve 3 to be coupled with the actuator 5. In this case, the throttle valve 3 is designed so as to be automatically controlled regardless of the stepping of the accelerator pedal 4.

The modes of operation of the switches to be used for the constant-speed cruising control will be described in the following way.

The main switch 26 may be of a push-push type and keeps its ON or OFF state unless it is further operated. The set switch 27 and the acceleration switch 28 may be of a push type and it is turned on only when it is pressed while it is automatically turned off once it is released. The coast switch 29 and the resume switch 30 may be of a swingable lever type, wherein their operation section is shared with each other and they are constantly biased in the neutral positions in which they are turned off, while the coast switch 29 is turned on when it is swung toward one direction and the resume switch 30 is turned on when it is swung toward the other direction.

Given the foregoing, conditions of executing the constant-speed cruising control are set as follows:
1. The main switch 26 is turned on.
2. The actual vehicle speed is over 40 kilometers per hour, for example.
3. All the set switch 27, acceleration switch 28, coast switch 29, resume switch 30, and cancel switch 31 are turned off. All of them may be referred to as command switches 44 in generic terms.
4. The set switch 27 is once turned off in the state in which all the above conditions 1 to 3 are met.

As the set switch 27 is turned on, the vehicle speed at which the set switch 27 was turned on is set to a target vehicle speed and the constant-speed cruising control is executed in such a manner that the vehicle is driven and cruised at the target vehicle speed.

For the constant-speed cruising system according to the present invention, the target vehicle speed is set or changed in the following way.

The target vehicle speed is kept on increasing, on the one hand, while the acceleration switch 28 is pressed, and the actual vehicle speed at the time when the acceleration switch 28 is released is set as a target vehicle speed. The target vehicle speed is kept on decreasing, on the other hand, while the coast switch 29 is pressed, and the actual vehicle speed at the time when the coast switch 29 is released is set as a target vehicle speed.

The constant-speed cruising control can be released when the brake is operated, namely, when at least either of the brake switch 21 or 22 is turned on. When the resume switch 30 is turned on after the constant-speed cruising control is released by means of operation of the brake, the constant-speed cruising control is resumed at a new target vehicle speed to which the latest target vehicle speed immediately prior to braking operation is set.

Given the foregoing, the constant-speed cruising control is described hereinafter.

Figure 2:
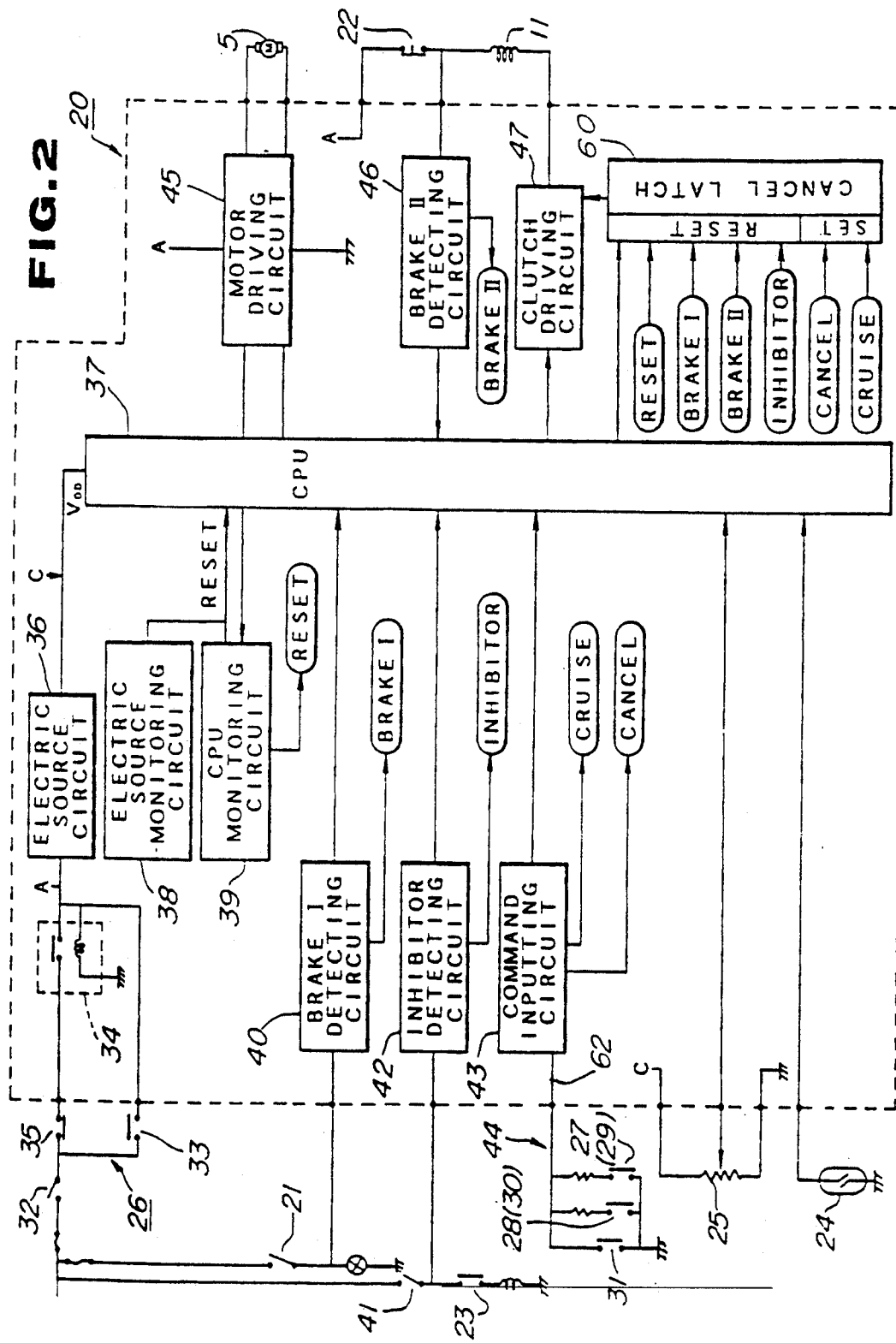
FIG. 2 is a block diagram of the control unit.

FIG. 2 is a view showing an outline of the control unit 20. When a normally open contact 33 of the main switch 26 is turned on while an ignition switch 32 is being turned on, the contact of a self-hold circuit 34 is turned on to hold a normally closed contact 35, thereby applying electricity to an electric source circuit 36 and starting a microcomputer 37 (CPU). When electricity is applied to an electric source monitoring circuit 38 and a CPU monitoring circuit 39 and the electric source circuit 36 is found abnormal, a reset signal is generated from the electric source monitoring circuit 38 to the CPU 37 which, in turn, generates a reset signal to the reset side of a cancel latch 60 consisting of a latch circuit in response to the reset signal. The CPU 37 is monitored by the CPU monitoring circuit 39 and, when the CPU 37 is found abnormal, a reset signal is generated to the reset side of the cancel latch 60 from the CPU monitoring circuit 39.

As the normally closed contact 35 of the main switch 26 is pressed and opened, the electric source is broken because the normally open contact 33 is turned off.

A brake I detecting circuit 40 senses an ON signal or an OFF signal of the first brake switch 21 and generates a first brake signal to the reset side of the cancel latch 60 in response to the ON signal.

An inhibitor detecting circuit 42 is to detect whether or not the inhibitor switch 23 connected in series to a starter switch 41 is turned on or off, and the signal detected (OFF signal) is inputted to the reset side of the cancel latch 60 as an inhibitor signal.

A command inputting circuit 43 detects the ON state or the OFF state of the command switch 44 consisting of the cancel switch 31, a combination of the acceleration switch 28 with the resume switch 30, and a combination of the set switch 27 with the coast switch 29. The command inputting circuit 43 is connected to the plurality of switches by an input wire 62, the signal detected is a cruise signal for implementing cruising at a constant speed, the cruise signal is inputted to the set side of the cancel latch 60 and, when the signal detected is a cancel signal for suspending the constant-speed cruising, i.e., cruising at a constant speed, the cancel signal is inputted to the reset side of the cancel latch 60.

To the CPU 37 are inputted a signal of the throttle opening angle, $\theta$, detected by the potentiometer 25 and a signal of an actual vehicle speed detected by the vehicle speed sensor 24.

A brake II detecting circuit 46 is to detect whether or not the second brake switch 22 is turned on or off and generates a brake II signal to the reset side of the cancel latch 60 in response to the ON signal.

The CPU generates a control signal to a driving circuit 45 for the servo motor 5. The clutch driving circuit 47 couples or uncouples the clutch 11 on the basis of a control signal from the CPU 37 and an output signal from the cancel latch 60. In other words, when the reset signal, the brake I signal, the brake II signal, the inhibitor signal and the cancel signal are inputted to the reset of the cancel latch 60, the cancel latch 40 brings the clutch 11 into an open state (OFF state) by operation of the clutch driving circuit 47. On the contrary, when the cruise signal is inputted to the set side of the cancel latch 60, the cancel latch 60 is set to bring the clutch 11 into a coupled state (ON state).

Detail of Constant-Speed Cruising Control

FIGS. 3 to 6 are flow charts illustrating an embodiment of the constant-speed cruising control.

Figure 3:
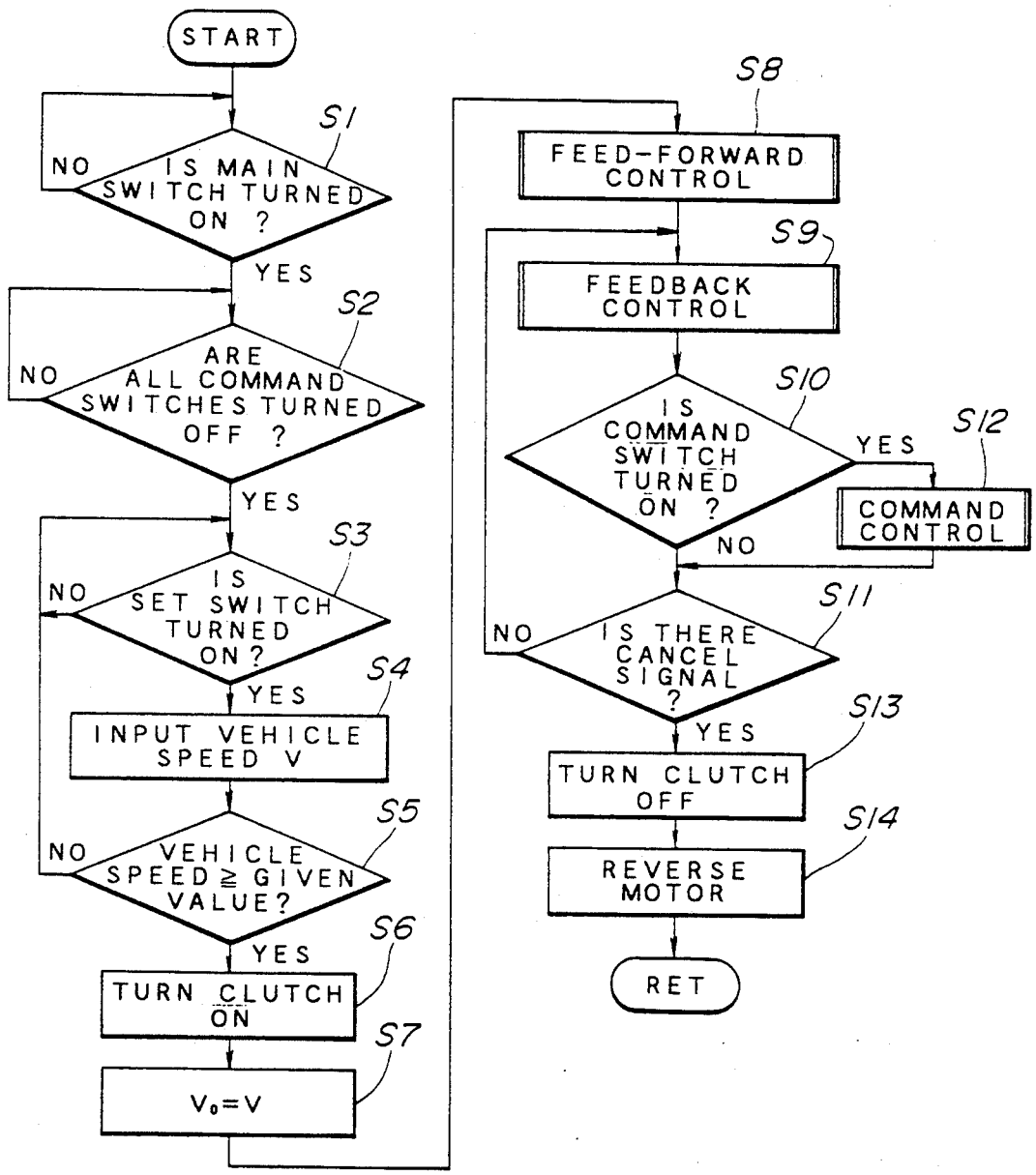
FIGS. 3 TO 6 are flow charts showing an embodiment of constant-speed cruising control.

As shown in FIG. 3, the ON state of the main switch 26 is first confirmed at step S1 and it is then confirmed at step S2 that all of the command switch 44 is turned off. If the command switches 44, i.e., the set switch 27, the acceleration switch 28, the coast switch 29, the resume switch 30 and the cancel switch 31, are confirmed to be all turned off, the the constant-speed cruising control at step S3 and thereafter is started as one of the conditions for executing the constant speed cruising control is established. In other words, if even one of the switches 27 to 31 would be stayed or fixed in its ON state or kept on being turned on, the start of the constant-speed cruising control at step S3 and thereafter is inhibited.

When all of the command switches 44 are confirmed to be turned off at step S2, the transfer to the constant-speed cruising control is allowed and the flow proceeds to step S3 at which the set switch 27 is turned on. Then at step S4, the actual vehicle speed V at this point of time is read. It is then judged at step S5 whether or not the actual vehicle speed V is greater than a predetermined value, i.e., 40 km/hour, for example. If it is confirmed at step S5 that the actual vehicle speed V is greater than the predetermined value, the flow proceeds to step S6 and the clutch 11 is coupled as all of the conditions for executing the constant-speed cruising control are met. Then at step S7, the actual vehicle speed V is stored as a target vehicle speed Vo and the opening angle of the throttle valve 3 is adjusted by feedback control so as to allow the actual vehicle speed V to reach the target vehicle speed Vo at step S9 after feed-forward control at step S8. This feedback control is continued unless the command switch 44 is operated (S10 and S11). The feed-forward and feedback control will be described more in detail hereinafter.

Once the command switch 44 is operated during the execution of the constant-speed cruising control, the flow proceeds to step S12 or S13. More specifically, when the acceleration switch 28 or the like, except for the cancel switch 31, out of the command switch 44, is operated, on the one hand, the flow proceeds to step S12 where command control is executed. When the cancel switch 31 is operated, on the other hand, the flow proceeds to step S13 where the clutch 11 is turned off to bring it into its OFF state to thereby uncouple the throttle valve 3 from the servo motor 5. Then at step S14, the servo motor 5 is reversed to its initial position and brought into a waiting state for the constant-speed cruising control to come next.

Feed-forward Control

Figure 4:
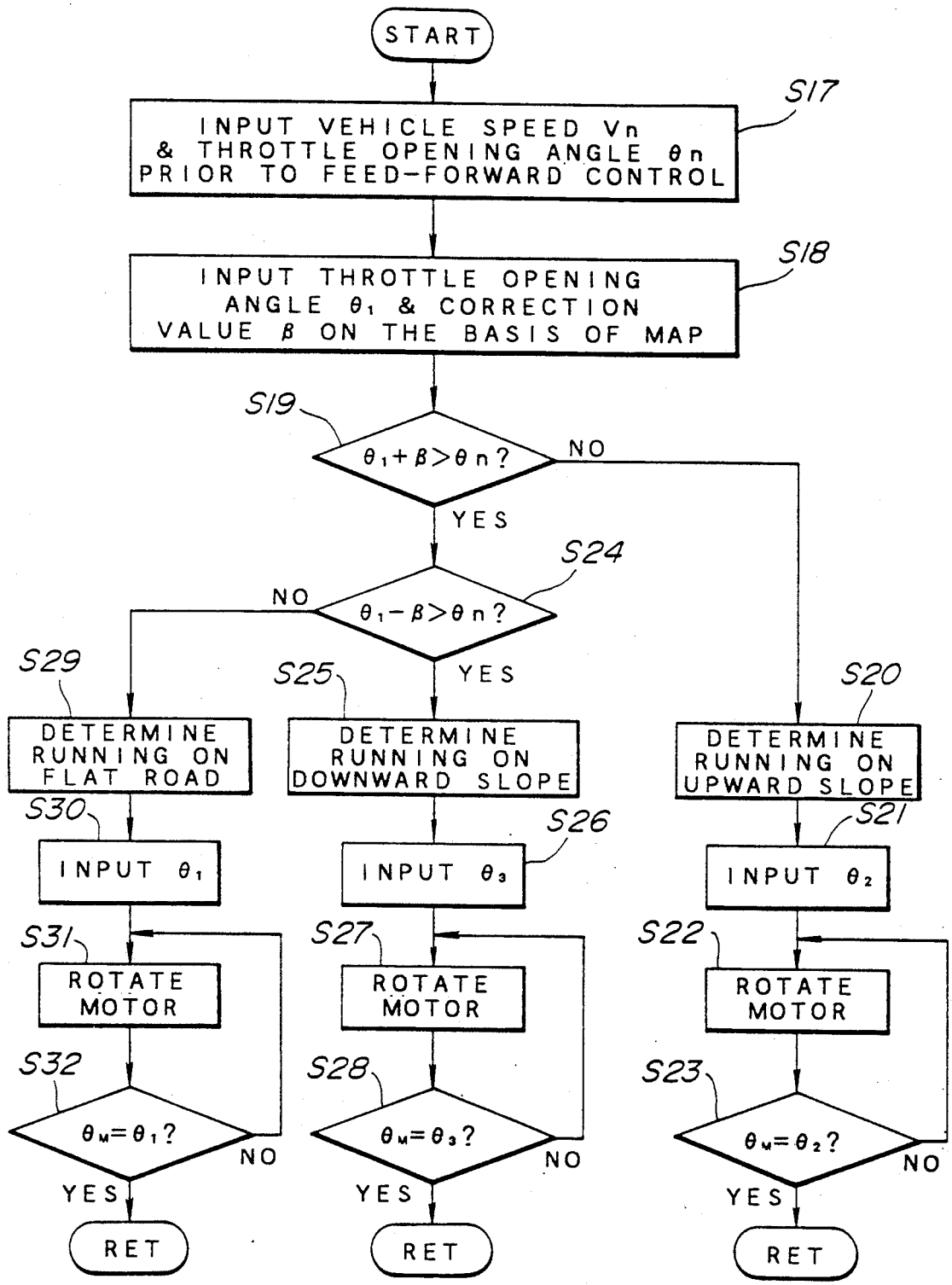

FIG. 4 is a flow chart representing an embodiment of the feed-forward control at step S8 and at step S41 and thereafter as will be described hereinafter. In the feed-forward control, the degree of inclination of the road surface on which the vehicle is running and the throttle opening angle $\theta$ with respect to the degree of inclination of the road surface is set as an estimated opening angle. In other words, the throttle opening angle $\theta$ in accordance with the degree of inclination of the road surface is provided prior to the transfer to the feedback control (step S9 etc.), in order to realize a rapid convergence to the target vehicle speed Vo.

Given the foregoing, there are read at steps S17 the vehicle speed Vn obtainable in the speed stage prior to the transfer to the feed-forward control and the throttle opening angle $\theta$ with respect thereto and the degree of inclination of the the face of the road on which the vehicle is running is judged at step S18 and thereafter.

Figure 7:
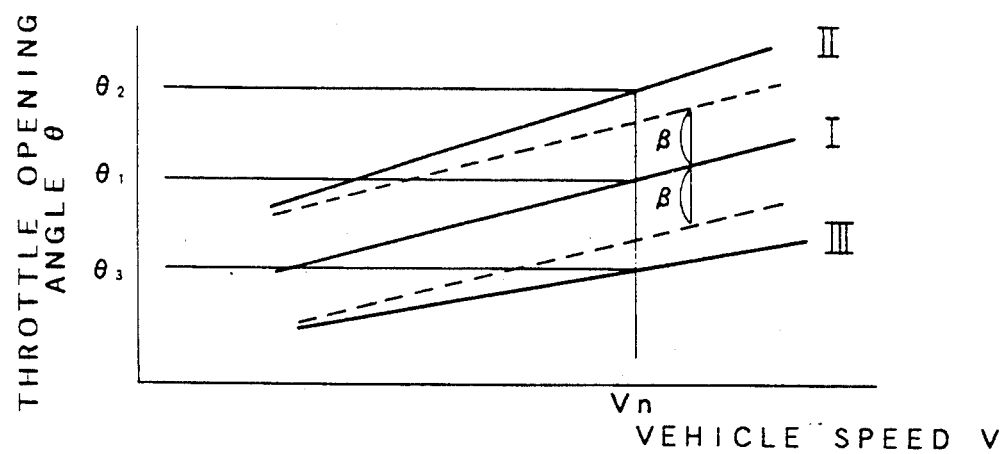
FIG. 7 represents the relationship of the vehicle speeds with the throttle opening angles on the basis of degrees of inclination of road surfaces on which the vehicle is travelling.

The degree of inclination of the road face is determined on the basis of the map as indicated in FIG. 7, the map is prepared from experimental results and stored in advance. As shown in FIG. 7, the line I indicates the relationship of the vehicle speed with respect to the throttle opening angle while running on the flat road, the line II indicates the relationship of the vehicle speed with respect to the throttle opening angle while running on the ascending slope, and the line III indicates the relationship of the vehicle speed with respect to the throttle opening angle while running on the descending slope. As is apparent from FIG. 7, when the throttle opening angle with respect to a particular vehicle speed is greater than the throttle opening angle provided for running on the flat road, namely, when the throttle opening angle with respect to the particular vehicle speed is on the side upper than the line I, on the one hand, it means that a greater load is imposed for gaining the particular vehicle speed and it is determined from this result that the vehicle is running on the ascending slope. When the throttle opening angle is smaller than the throttle opening angle provided for running on the flat road, namely, when the throttle opening angle is located on the side lower than the line I, on the other hand, it means that a smaller load is imposed for gaining the certain vehicle speed and that the vehicle is running on the descending slope.

It is to be noted, however, that determination of the running status of the vehicle simply on the basis of the location of the side upper or lower than the line is likely to cause an error in judgement because a tolerance is too small. Hence, a correction value $\beta$ is given so as to allow certain ranges upper and lower than the line I to be determined as running on the flat road, too, thereby preventing the hatching of control over the throttle opening angle due to an error in judgement. It is to be noted, however, that whether running on the ascending or upward slope or on the descending or downward slope cannot be determined unless the degree of inclination of the road face would become great enough when the correction value $\beta$ is set to a large value. This reduces the significance of correction on the basis of the degree of inclination of the road face. If the correction value $\beta$ is set to a small value, on the contrary, it is determined that the vehicle is running on the ascending slope or on the descending slope be determined even if the degree of inclination of the road face would be very small. This may increase the significance of correction on the basis of the degree of inclination of the road face, however, this may rather induce errors in judgement. Hence, the correction value $\beta$ should be determined with these points taken into account.

First at step S18, the throttle opening angle $\theta_1$ at the time of running on the flat road is given from the line I on the basis of the vehicle speed Vn. Then at step S19, it is judged whether the throttle opening angle $\theta_n$ is smaller than the sum of the throttle opening angle $\theta_1$ and the correction value $\beta$, namely, whether the following relationship is established:

$$\theta_n < \theta_1 + \beta$$

When it is decided at step S19 that the throttle opening angle $\theta_n$ is not smaller than the sum of the throttle opening angle $\theta_1$ and the correction value $\beta$, namely, $\theta_n \leq \theta_1 + \beta$, on the one hand, it is found that the vehicle is running on the ascending slope and the throttle opening angle $\theta_2$ is given on the basis of the line II, and the servo motor 5 is rotated so as for the throttle opening angle to reach and maintain the throttle opening angle $\theta_2$ as a target (S21–S23).

When it is decided at step S19 that the throttle opening angle $\theta_n$ is smaller than the sum thereof, namely, the relationship of $\theta_n < \theta_1 + \beta$ is established, it is then judged at step S24 whether or not the relationship of $\theta_n < \theta_1 - \beta$ is established. If this relationship is decided to be established, on the one hand, the vehicle is running on the descending slope (S25), and the throttle opening angle $\theta_2$ is given on the basis of the line III and the servo motor 5 is rotated so as to reach the throttle opening angle $\theta_2$ as a target (steps S26–S28).

At step S24, on the other hand, when it is decided that the relationship is not established, the vehicle is found to be running on the flat road at step S29 and the servo motor 5 is rotated so as to reach the throttle opening angle $\theta_1$ on the basis of the line I as a target.

Feedback Control

Figure 5:
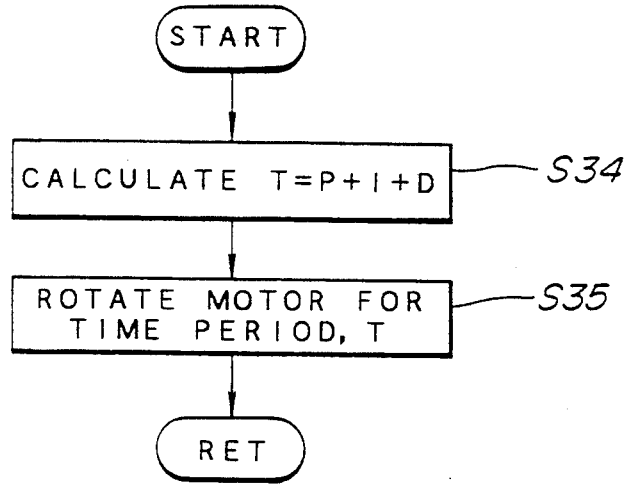

FIG. 5 is a flow chart showing the specific control content of the feedback control. The feedback control referred to herein is PID control. At step S34, the time period T for which electricity is applied to the servo motor 5, in accordance with a vehicle speed variation $\nu$ between the actual vehicle speed V and the target vehicle speed Vo, i.e., $\nu = V - Vo$, is calculated by the following formula:

$$T = I + P + D$$

$$I = Ki \times \nu n$$

$$P = Kp \times (\nu n - \nu n - 1)$$

$$D = Kd \times (\nu n - 2\nu n - 1 + \nu n - 2)$$

where
- Ki is an integral constant;
- Kp is a proportional constant;
- Kd is a differential constant;
- $\nu n$ is a deviation of the current vehicle speed;
- $\nu n - 1$ is a deviation of the latest vehicle speed; and
- $\nu n - 2$ is a deviation of the second latest vehicle speed.

Command Control

Figure 6:
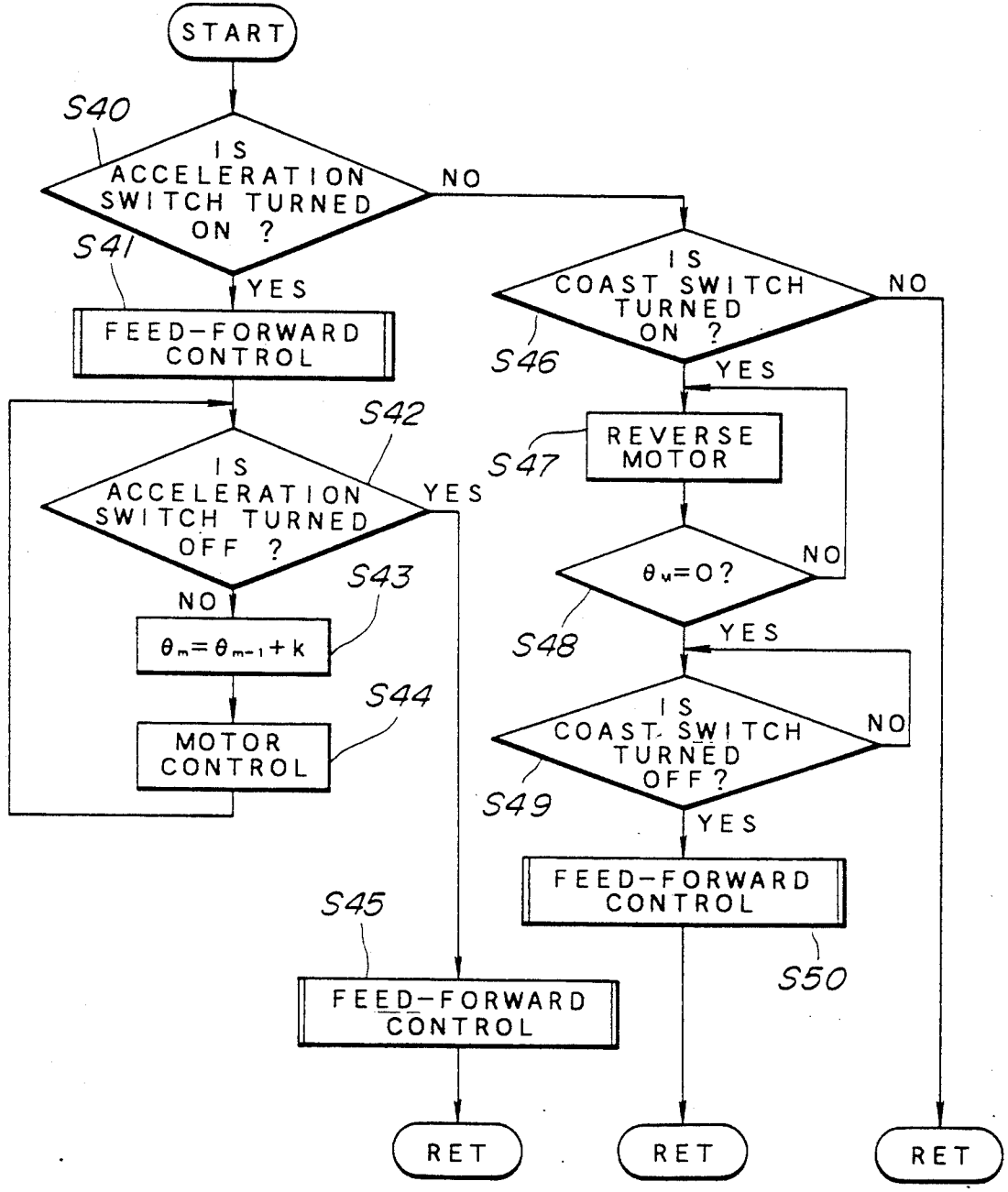

FIG. 6 is a flow chart indicating the specific content of command control at step S12 (FIG. 3).

When it is decided at step S40 that the acceleration switch 28 is turned on, the vehicle speed at the time when the acceleration switch 28 was turned on is subjected to feed-forward control immediately thereafter. As long as the acceleration switch 28 is turned on, acceleration is increased and the throttle opening angle $\theta_m$ is enlarged so as to reach a target throttle opening angle $\theta_m$ ($\theta_m = \theta_{m-1} + k$; wherein k is a given value) at steps S42–S44. At the time when the acceleration switch 28 is turned off, the flow proceeds to step S45 where the vehicle speed at that time is set as a target vehicle speed Vo. Then the constant-speed cruising control is implemented by means of the feedback control (step S9) after feed-forward control.

When the coast switch 29 is turned on, control after step S46 is executed. As long as the coast switch 29 is turned on, the servo motor 5 is reversed to its capacity limit to decelerate under the full closed condition of the throttle valve 3 (steps S46–S49). At the time when the coast switch 29 is turned off, the flow proceeds to step S50 where the vehicle speed at that time is set as a target vehicle speed Vo. Then the constant-speed cruising control is executed by means of the feedback control (step S9) after feed-forward control.

The present invention has been described by way of the preferred embodiments and it is to be understood that the present invention is not restricted to those embodiments.

In step S2 (FIG. 3), the order of priority may be set to the commands switch 44 and the input of command may be accepted after it was confirmed that all the switches having the higher order of priority have been turned off. This arrangement permits a normal acceptance of the command input even if one of the command switch would be fixed in its ON position.

For instance, the order of priority may be set from the higher order to the lower order, such as from the cancel switch 31, the set switch 27, the coast switch 29, the resume switch 30, and the acceleration switch 28. In this case, suppose that the acceleration switch 28 is fixed in the ON position. Then the command signals from the cancel switch 31, the set switch 27, the coast switch 29 and the resume switch 30, each having the order of priority higher than the acceleration switch 28, are accepted while the acceleration signal from the acceleration switch 28 is not accepted.

In this case, the vehicle is decelerated when the coast switch 29 is turned on and the constant-speed cruising can be performed at the reduced vehicle speed after the coast switch 29 was turned off at a given vehicle speed. This constant-speed cruising is cancelled when the cancel switch 31 is turned off. The constant-speed cruising can be resumed after it was cancelled by turning the resume switch 30 on. A new constant-speed cruising can be started by turning the set switch 27 on.

Furthermore, suppose that the set switch 27 is fixed in the ON state. In this instance, the command signals except for the cancel signal from the cancel switch 31 cannot be accepted.

As have been described hereinabove, only the command input on the safety side then the fixed command switch is accepted, thereby continuing the constant-speed cruising on the safety side by the fixed command switch and judging the fixed command switch.

For diesel engines, an amount of injection of fuel from a fuel injecting valve may be adjusted as a vehicle speed governing means in the constant-speed cruising apparatus.

It is to be understood that the foregoing text and drawings relate to embodiments of the present invention given by way of examples but not limitation. Various other embodiments and variants are possible within the spirit and scope of the present invention.

What is claimed is:

1. A constant-speed cruising system for a vehicle, comprising:
    a vehicle speed governing means of an engine in the vehicle;
    a control unit for constant-speed cruising control, which controls the vehicle speed governing means so that a vehicle speed reaches a target vehicle speed; and
    an instruction signal generating means for generating a variety of instruction signals applied to the control unit for executing constant-speed cruising control by the control unit;
    wherein the instruction signal generating means comprises a plurality of switch means which can be manually operated by a driver and wherein the switch means generate the instruction signals when turned on; and
    wherein the control unit comprises a judgment means for judging whether or not to implement constant-speed cruising control on the basis of a signal from the switch means and the judgment means is designed to determine that all the switch means are turned off and then to execute the constant-speed cruising control only when one of the switch means is turned on.

2. A constant-speed cruising system as claimed in claim 1, wherein:
    the control unit comprises a command inputting circuit for receiving signals from the plurality of the switch means; and
    the command inputting circuit is connected to the plurality of the switch means through one input wire.

3. A constant-speed cruising system as claimed in claim 2, wherein the plurality of the switch means are connected in parallel to each other between the one input wire and a ground.

4. A constant-speed cruising system as claimed in claim 3, wherein:
    the plurality of the switch means comprise a set switch means, an acceleration switch means, a coast switch means and a resume switch means;
    wherein the set switch means has a function of setting a vehicle speed at which the set switch means is turned on to a target vehicle speed for constant-speed cruising control, when the set switch means is turned on;
    the acceleration switch means has a function of setting a vehicle speed to a target vehicle speed when the acceleration switch means is turned off, and when the acceleration switch means is maintained pressed, to gradually accelerate the vehicle and thereafter the acceleration switch means is released;
    the coast switch means has a function of setting a vehicle speed to a target vehicle speed when the coast switch means is turned off and when the coast switch means is maintained pressed, to decelerate the vehicle until the coast switch means is released; and
    the resume switch means has a function of setting the latest target vehicle speed when the resume switch means is turned on.

5. A constant-speed cruising system as claimed in claim 4, wherein:
    the set switch means and the coast switch means are used both as a first switch; and
    the acceleration switch means and the resume switch means are used both as a second switch.

6. A constant-speed cruising system as claimed in claim 1, wherein:
    the engine is an engine of an Otto type; and
    the vehicle speed governing means is a throttle valve disposed in an air intake system of the engine;
    wherein the throttle valve is connected to an actuator which in turn is controlled by the control unit.

7. A constant-speed cruising system as claimed in claim 6, wherein:
    a clutch for coupling or uncoupling the throttle valve to or from the actuator is interposed between the throttle valve and the actuator; and
    a clutch driving circuit is disposed for controlling the clutch to be coupled or uncoupled on the basis of an instruction signal from the control unit;
    wherein the clutch driving circuit turns the clutch on to couple the throttle valve to the actuator when constant-speed cruising control is executed and wherein the clutch driving circuit turns the clutch off to uncouple the throttle valve from the actuator when constant-speed cruising control is released.

8. A constant-speed cruising system as claimed in claim 7, wherein the control unit comprises a microcomputer.

9. A constant-speed cruising system as claimed in claim 7, further comprising a release signal generating means for instructing a release of constant-speed cruising control to the control unit;
    wherein the constant-speed cruising control is released when the release signal is inputted into the control unit from the release signal generating means.

10. A constant-speed cruising system as claimed in claim 7, wherein the clutch driving circuit is provided with an exclusive clutch controlling circuit for instructing the clutch to be turned on or off.

11. A constant-speed cruising system as claimed in claim 10, further comprising a release signal generating means for instructing a release of constant-speed cruising control to the control unit and for instructing the clutch to be turned off to the clutch controlling circuit;

wherein, when the release signal is generated from the release signal generating means, the constant-speed cruising control by the control unit is released and the clutch is turned off by the clutch controlling circuit, thereby uncoupling the throttle valve from the actuator.

12. A constant-speed cruising system as claimed in claim 11, wherein the release signal generating means comprises a cancel switch to be manually operated and the release signal is generated when the cancel switch is operated.

13. A constant-speed cruising system as claimed in claim 12, wherein the release signal generating means has a brake switch disposed to a foot brake pedal to be manually operable and the brake switch generates the release signal when the foot brake pedal is stepped down.

14. A constant-speed cruising system as claimed in claim 13, wherein the release signal generating means has an inhibitor switch for detecting a range position of an automatic transmission and the inhibitor switch generates the release signal when the range position of the automatic transmission is a range position other than a forward speed range.

15. A constant-speed cruising system as claimed in claim 10, wherein the control unit comprises a microcomputer and the clutch driving circuit comprises a latch circuit.

16. A constant-speed cruising system as claimed in claim 1, further comprising a release signal generating means for instructing a release of constant-speed cruising control to the control unit;

wherein the constant-speed cruising control is released when the release signal is inputted into the control unit from the release signal generating means.

17. A constant-speed cruising system as claimed in claim 1, wherein the judgment means further inhibits execution of the constant-speed cruising control when it is determined that any one of the switch means has become fixed in its on position.

* * * * *